United States Patent
Garrett et al.

(10) Patent No.: US 7,236,910 B1
(45) Date of Patent: Jun. 26, 2007

(54) EQUIPMENT IDENTIFICATION, TRACKING AND FAILURE ANALYSIS PROCESS

(75) Inventors: Mark Garrett, Edmond, OK (US); Jeffrey C. Markowski, Oklahoma City, OK (US); Ryan Decker, Oklahoma City, OK (US); Paul Jay, Midland, TX (US)

(73) Assignee: Wood Group ESP, Inc., Oklahoma City, OK (US)

( * ) Notice: Subject to any disclaimer, the term of this patent is extended or adjusted under 35 U.S.C. 154(b) by 0 days.

(21) Appl. No.: 11/047,886

(22) Filed: Feb. 1, 2005
(Under 37 CFR 1.47)

Related U.S. Application Data

(60) Provisional application No. 60/599,774, filed on Aug. 9, 2004.

(51) Int. Cl.
*G06F 19/00* (2006.01)
(52) U.S. Cl. .................. 702/183; 702/184; 702/185; 702/182; 700/108
(58) Field of Classification Search ............. 702/183, 702/113–115, 6, 119, 123, 122, 176–178, 702/179, 181, 182, 184, 185, 187, 186, 188
See application file for complete search history.

(56) References Cited

U.S. PATENT DOCUMENTS

| | | | | |
|---|---|---|---|---|
| 6,035,264 A * | 3/2000 | Donaldson et al. | ......... | 702/182 |
| 6,038,517 A * | 3/2000 | Dobbins et al. | ............. | 702/82 |
| 6,728,660 B2 * | 4/2004 | Bjornson | .................... | 702/185 |
| 6,834,256 B2 * | 12/2004 | House et al. | ............... | 702/181 |
| 6,874,025 B2 * | 3/2005 | Hoogenboom et al. | ..... | 709/225 |
| 6,954,930 B2 * | 10/2005 | Drake et al. | ................ | 717/178 |
| 2002/0055804 A1 * | 5/2002 | Betawar et al. | ............. | 700/117 |
| 2005/0004781 A1 * | 1/2005 | Price et al. | ................ | 702/188 |
| 2005/0240545 A1 * | 10/2005 | Schachtely et al. | ........... | 706/47 |
| 2006/0190120 A1 * | 8/2006 | Yajima et al. | ............... | 700/121 |

OTHER PUBLICATIONS

Aoki et al., "Interactive Web forms based on assistance rules", Oct. 6-9, 2002, IEEE, 2002 IEEE International Conference on Systems, Man and Cybernetics, vol. 7, 8 pages.*

Pfefferman et al., "A nonparametric nonstationary procedure for failure prediction", Dec. 2002, IEEE Transactions on Reliability, vol. 51, issue 4, pp. 434-442.*

Patel, "Categorisation of Failures in Telecommunication Networks", Jul. 8-10, 2004, Proceedings of the 4th IASTED International Multi-Conference, Wireless and Optical Communications, pp. 519-523.*

* cited by examiner

*Primary Examiner*—Hal Wachsman
(74) *Attorney, Agent, or Firm*—Crowe & Dunlevy, P.C.

(57) ABSTRACT

A process for gathering data from a plurality of users at remote terminals connected to a central database that restricts the data entered into the central database by providing users with predefined responses to scripted prompts and screening the new data entered into the central database for erroneous responses by comparing the data with existing data through a series of rules. In an alternate embodiment, the present invention includes a process for gathering and analyzing information that includes maintaining a central database, accessing the central database from a remote terminal through an interface, entering information into the central database through the interface, validating the entered information against a set of rules and analyzing the validated information to generate performance indicators for the equipment placed into service. The interface preferably restricts the information entering the central database to a controlled group of responses to a series of scripted prompts.

5 Claims, 3 Drawing Sheets

EVENT DISCLOSURE FORM — 134

- 140 TECHNICIAN
- 142 EQUIPMENT TYPE
- 144 EQUIPMENT I
- 146 EVENT DESCRIPTN
- 148 EVENT REASON
- 150 ACTION TAKEN

ADDITIONAL COMMENTS — 152

FIG. 3

EQUIPMENT IDENTIFICATION, TRACKING AND FAILURE ANALYSIS PROCESS

RELATED APPLICATIONS

This application claims the benefit of U.S. Provisional Patent Application No. 60/599,774, entitled Equipment Identification, Tracking and Failure Analysis Process, filed Aug. 9, 2004, the disclosure of which is incorporated herein.

FIELD OF THE INVENTION

This invention relates generally to the field of data management systems, and more particularly to data management systems for use with equipment tracking and analysis.

BACKGROUND

Computerized database systems have been used for decades to acquire, store and manipulate useful information. Initially, databases were housed in computers and attached storage peripherals and accessed via local terminals. With developments in remote access computing, users were able to enter, retrieve or manipulate data stored in a central database from remote locations. Today, centralized databases are accessed by users throughout the world via wireless and broadband optical connections.

Databases have found particular utility in monitoring inventories, performance characteristics and other assorted information about equipment sold or leased by a company. In many cases, each piece of equipment is assigned a unique identifier that is used to associate that piece of equipment within a database. As the equipment is used, sold, moved, repaired or replaced, appropriate information can be entered into the database and correlated with the piece of equipment so that a complete historical record can be maintained. In some instances, databases have permitted the entry of "user comments" that provide additional information about the particular piece of equipment.

Although helpful, information obtained from the field is often subjective and non-standardized. While modern databases can be readily configured to accept and store non-routine information from remote locations, this type of information presents numerous problems during subsequent data analysis. Inconsistent information from a database can lead to large margins of error in subsequent calculations. It is to these and other deficiencies in the prior art that the present invention is directed.

SUMMARY OF THE INVENTION

In a preferred embodiment, the present invention includes a process for gathering new data from a plurality of users at remote terminals connected to a central database. The process preferably includes restricting the new data entered into the central database by providing users with predefined responses to scripted prompts and screening the new data entered into the central database for erroneous responses by comparing the new data with existing data through a series of rules. In an alternate embodiment, the present invention includes a process for gathering and analyzing equipment information that includes maintaining a central database, accessing the central database from a remote terminal through an interface, entering information into the central database through the interface, validating the entered information against a set of rules and analyzing the validated information to generate performance indicators for the equipment placed into service. In a particularly preferred embodiment, the interface restricts the information entered into the central database to a controlled group of responses to a series of scripted prompts.

BRIEF DESCRIPTION OF THE DRAWINGS

FIG. 3 is a depiction of a end page within the interface of FIG. 2 that can be used to provide input data to the data management system of FIG. 1.

DETAILED DESCRIPTION OF THE PREFERRED EMBODIMENT

For the purposes of this disclosure, a data management system 100 is configured and applied to the identification, tracking and failure analysis of equipment used to discover, recover and transport petroleum products from underground reservoirs. It will be appreciated, however, that the novel aspects of the disclosed data management system 100 will also find utility in other industries and endeavors. For example, the data management system 100 can also be used to accurately monitor the performance of leased computer equipment while in service.

Through the combined use of software and hardware, the data management system 100 incorporates and coordinates three general functions; data acquisition, data validation and data analysis. To ensure that the analysis yields reliable information, it is important that the data used as input for these analyses is not only accurate, but also standardized throughout the pool of users providing input to the system 100. For applications involving the acquisition of data from multiple remote locations, it is particularly important to ensure that each user entering data adheres to an established convention.

Figure 1:
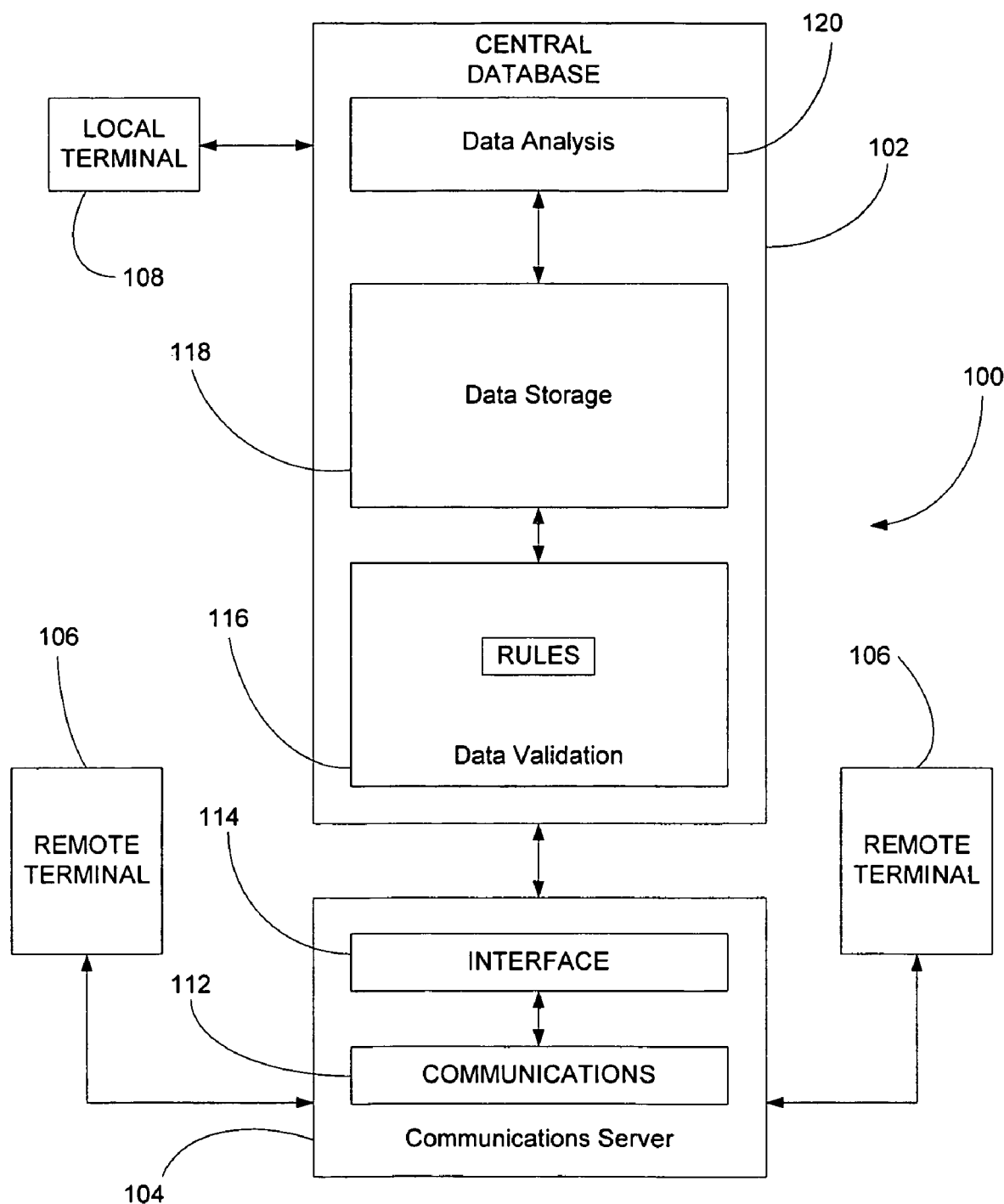
FIG. 1 is a functional flow chart of a data management system constructed in accordance with a preferred embodiment of the present invention.

As shown in the functional diagram in FIG. 1, the system 100 preferably includes a central database 102 and a communications server 104 that is operably connected to the central database 102. For convenience, the communications server 104 is preferably a dedicated server that is connected to the central database 102 via a local or external network. It will be understood, however, that there are a wide range of available configurations encompassed by the preferred embodiment. For example, the central database 102 could be housed on one or more computers that are singularly or collectively capable of storing data, manipulating data and communicating with the remote terminals 106, either through the separate communications server 104 or through an integrated communications module (not shown). Similarly, the communications server 104 could be configured as an integral part of the central database 102.

The system 100 also includes one or more remote terminals 106 connected to the communications server 104 through a suitable network (not separately designated). The system 100 optionally includes one or more local terminals 108 connected directly to the central database 102. The remote terminals 106 are preferably capable of communicating with the central database 102 over a shared network, such as the Internet, or over a dedicated, private network.

The hardware components addressed above cooperate with various software components for carrying out the functions and processes assigned to the system 100. In a presently preferred embodiment, the software includes a communications component 112, an interface component 114, a data validation component 116, a data storage component 118 and a data analysis component 120. Depending on the configuration of the necessary hardware components, these software components may reside on a single computer or multiple computers. While numerous software components are described for the purpose of this disclosure, it will be appreciated by one of ordinary skill in the art that fewer than all of the described software components may be used in a preferred embodiment.

The communications component 112 is preferably configured to manage the transfer of data between the remote terminals 106 and the central database 102. In a preferred embodiment, the communications component 112 resides on the communications server 104 and provides access to the central database 102 through hypertext transfer protocol (HTTP). It will be understood that the communications component 112 may reside on-site with the central database 102 or with an associated Internet Service Provider (ISP). In a particularly preferred embodiment, the communications component 112 permits secure transactions between the remote terminals 106 and the central database 102. In an alternative embodiment, the communications component 112 is a proprietary client package is used to access an associated host program through a specified communications protocol. Using this combination of hardware and software, data can be entered into the central database 102 from a remote terminal 106 and information can be retrieved from the central database 102 by the remote terminals 106.

Figure 2:
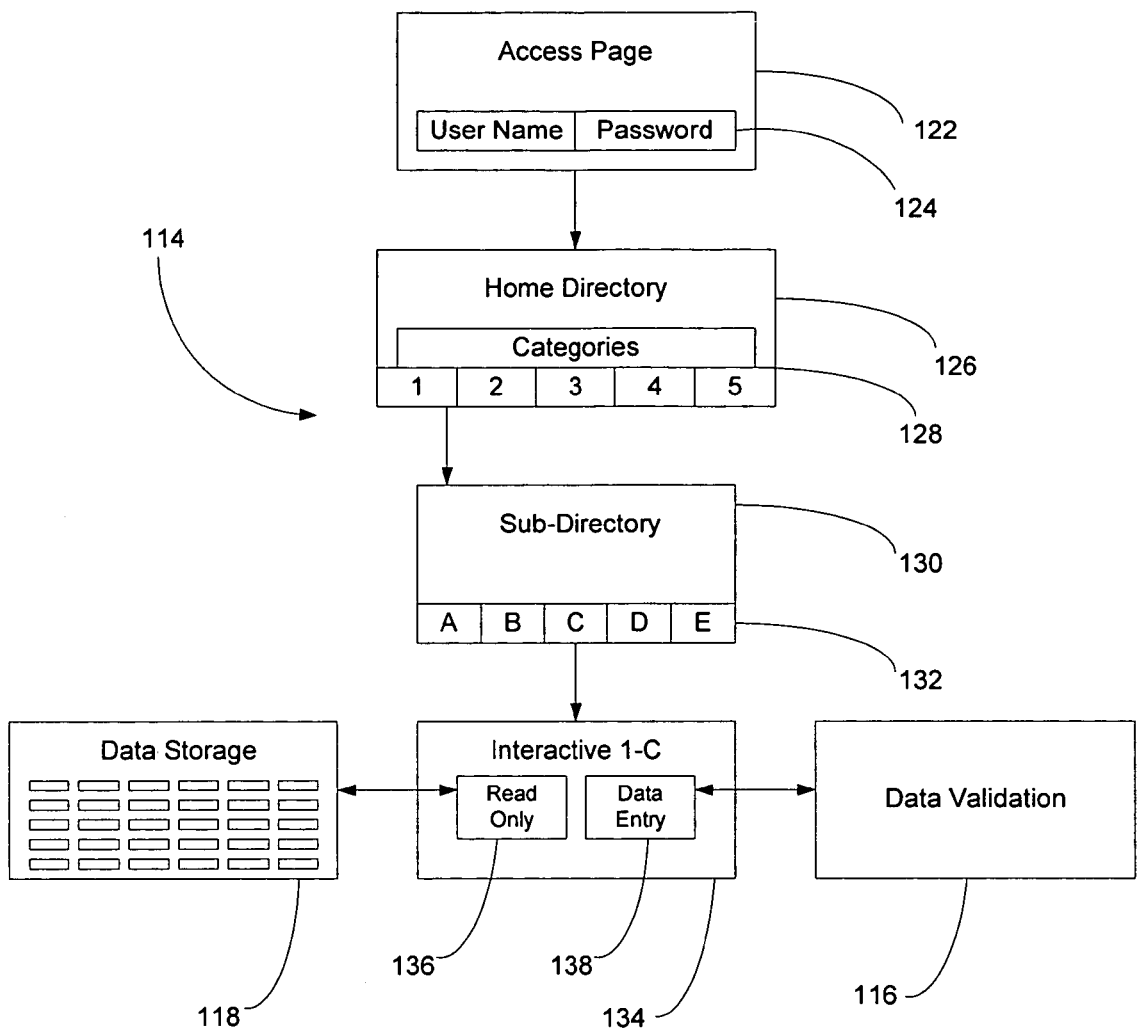
FIG. 2 is a functional flow chart of a preferred embodiment of an interface used with the data management system of FIG. 1.

The interface 114 is used to control input to, and output from, the central database 102. In the presently preferred embodiment, the interface 114 is configured as a number of both secure and public access web pages that are accessible with a conventional web browser program residing on the remote terminals 106. As shown in FIG. 2, the interface 114 is preferably configured to include a public access page 122 that can be viewed over the world wide web. The access page 122 preferably includes a user login 124 that restricts access to secure pages by requiring user identification and password.

Once logged-in, the authorized user is shown a home directory page 126. The home directory page 126 preferably includes links to a number of different categories 128, such as equipment, installations or applications, analysis reports and program utilities, Selecting one of the categories brings the user to a sub-directory 130 that provides sub-categories 132. The user can then select the appropriate sub-category 132 to arrive at an end page 134. It will be understood that this model is merely a single illustration of the interlinking pages within the interface 114. There could be greater or fewer numbers of intermediate pages between the access page 122 and the end page 134. Furthermore, the end page 134 could include links to other pages in the interface 114.

For example, end page 134 corresponds to the user's selection of category "1," sub-category "C." In the preferred embodiment, the end page 134 is used to input or retrieve information from other portions of the central database 102. In a preferred embodiment, information is input or retrieved through particular fields on the end page 134. The read only field 136 can be used to display information stored in the data storage component 118 ("read only data"). For example, the read only field 136 can be used to provide the user with technical specifications or operational history for a selected piece of equipment. In contrast, the data entry fields 138 can be used to transfer information from the user to the central database 102 ("input data"). Following the same example, input data might contain information about the performance characteristics of a piece of equipment displayed in the read only field 136.

The information entered into the data management system 100 may ultimately be used for a wide range of analyses and comparisons. In many cases, the input data is used as the basis for calculations without separate human verification. To provide useful and reliable analysis, the input data must be accurate and properly entered into the system 100. Thus, the input data must not only be substantively correct, but it must also be entered into the system 100 in accordance with an accepted convention.

The consistency of the input data is maintained by the structured functionality of the interface 114. The interface 114 is configured to allow the user to enter a wide variety of information into the central database 102, but only in response to a series of scripted prompts and through data entry fields 138 using pre-defined codes and options. The data entry fields 138 may include a variety of input mechanisms, including drop-down boxes and lookup fields that are linked with information held in the data storage component 118 of the central database 102.

With reference to FIG. 3, a user might describe a failure event through a hierarchal sequence of data entry fields 138 on an end page 134. For example, to begin the event disclosure report, the user might select his name from the technicians "drop-down" box 140. The user could then select the subject equipment from an equipment type drop-down box 142 and an equipment identification (ID) lookup field 144. The user might then select the appropriate event description from an event description lookup field 146, event reason from the event reason lookup field 148 and action taken from the action taken lookup field 150. The user could add subjective or explanatory comments through use of the "additional comments" box 152. It will be understood that the selection of input parameters and mechanisms will vary by application. Limiting the user's input to controlled responses to scripted prompts ensures the consistency of the input data entered into the central database 102. Thus, the consistency of the input data to the central database 102 is controlled by the structured interface 114.

To ensure the accuracy of the input data, the data validation component 116 checks the input data against a set of preestablished logic, or "rules." In the preferred embodiment, the rules compare the input data against information already contained within the central database 102. For example, in the presently preferred embodiment, the rules are configured to reject the conflicting use of duplicate equipment identification numbers. Other rules prohibit input data that indicates that a piece of equipment is in two locations simultaneously (geographic), that a specified action has occurred out of sequence (temporal) or that a piece of equipment is owned by two parties (ownership). It will be understood that additional rules can be used in combination or in the alternative to these general rules. Once the input data has been entered through the interface 114 and screened for inconsistency through the data validation component 116, the input data becomes "stored data" in the data storage component 118.

Because the interface 114 and data validation component 116 collectively and individually ensure that the stored data is consistent and accurate, the stored data can be used to provide meaningful analysis with a high degree of confidence. In a preferred embodiment, the stored data is used to provide key performance indicators ("KPIs") for the monitored equipment. A key performance indicator is a series of standard calculations and graphs used to measure and trend the performance of equipment during use.

In the presently preferred embodiment the data management system 100 is used for the identification, tracking and failure analysis of equipment used to discover, recover and transport petroleum products from underground reservoirs. The key performance indicators are used to improve the performance (run life) of well systems and equipment by benchmarking the performance in a particular field, benchmarking performance in similar fields, benchmarking the performance of individual equipment types in all installations or in defined operating conditions and benchmarking against competitive well systems and equipment. In a particularly preferred embodiment, a set of three standard calculations are used as the key performance indicators. These calculations can be applied to different data sets to allow flexibility while maintaining consistency.

As shown in Equation No. 1, below, the first standard calculation in the preferred embodiment is the mean time to failure ("MTTF"), which is defined as the mean or average time to failure (or pull) based on actual run time during a specific time period. During the specific time period both failed (or pulled) and running installations are accounted for. This metric is used to measure the performance of both wells and equipment.

$$MTTF=(N \times T)/F \qquad \text{Equation 1}$$

where,

N: Total number of wells in operation

T: Time period

F: Number of failures (or pulls)

The total number of wells in operation (N) is preferably calculated as a weighted average, on a weekly basis, of the number of wells that are running during the time period. The total number of wells in operation (N) is calculated by summing the number of wells at the end of each week during the time period and then dividing by the number of weeks during the time period. The time period (T) is preferably selected from one of two standardized time periods. A long-term trend uses one-year time periods as the data points (calendar years). The value for the current year can be projected at the end of each month by utilizing a 12-month rolling time period. The long-term trend permits the projection of a meaningful year of end value. A "short-term" trend uses one-month time periods as the data points on a "rolling" 12 month scale.

The number of failures or pulls (F) is preferably defined as the total number of failures or pulls during the time period (T). The type of pulls or failures utilized vary depending on the application. In the preferred embodiment, the types of pulls or failures include: all pulls regardless of reason, all down-hole failures, all submersible equipment failures, pump failures, motor failures, seal failures and cable failures. Preferably, there cannot be multiple failures for a given pull; there can be one primary reason for failure (or pull). If multiple components fail (i.e. two pumps) in a given pull, it preferably counts as only one pump failure.

In a preferred embodiment, the calculations can be used to provide the basis for graphical analysis of the performance of the monitored equipment. Such graphs can be filtered to provide a more focused analysis. For example, in the preferred embodiment, well equipment performance graphs can be filtered by completion, well, lease, field, area, region, well attributes or customer.

As shown in Equation No. 2, below, the second standard calculation in the preferred embodiment is the equipment run life ("ERL"), which is defined as the average run life, from start to stop times, of a specific group or type of equipment. Any equipment that can be tracked by serial number can be included in this KPI. The average is calculated by summing the actual run days of all individual pieces of equipment and then dividing by the total number of pieces, as shown in Equation No. 2:

$$ERL=\Sigma(RT)/N \qquad \text{Equation 2}$$

where, $\Sigma(RT)$: Summation of run time

N: Total number of pieces of equipment.

The summation of run time ($\Sigma(RT)$) is obtained by adding all the actual run days for all pieces of equipment within the scope of the filters. This run time is the total number of days the equipment has been in operation, regardless of the number of installations it has been in. The total number of pieces of equipment (N) is preferably calculated on the total number of pieces installed, not the total number of installations. The equipment run life indicator can be calculated using a variety of time periods to provide various analysis, including long-term and short-term performance characteristics. Graphs reflecting the results of the equipment run life calculations can be filtered using a variety of criteria to provide more focused analysis.

The third key performance indicator provided by the preferred embodiment is the failure distribution (FD) analysis, which is defined as a simple histogram of failures over a given period of time, with the failure counts presented in separated run-time increments. The time period used for the failure distribution analysis is date range driven and can be based on any start and end date. The number of failures charted on the histogram is the total number of failures that occurred during the specified date range. The type of failures utilized may vary depending on the application. In the presently preferred embodiment, the failure distribution can be used to analyze all failures (pulls), all down-hole failures, all submersible equipment failures, pump failures, motor failures, seal failures and cable failures. The failure distribution analysis can be focused by limiting the input to specified characteristics, such as, for example, completion, well, lease, field, area, region, well attributes or customer.

The proper definition and identification of failure modes is important to meaningful run life calculations. In the preferred embodiment, a failure is defined as an event in which any equipment or part of the equipment does not or would not perform to required operating specifications due to mechanical wear, mechanical damage or electrical damage. If a piece of equipment cannot be returned to service without repairing or replacing damaged parts it is considered "failed" under the preferred embodiment.

To ensure that the input data used as the basis for the KPIs is accurate and consistent, the interface 114 is preferably configured to provide the user with input options, such as through data entry fields 138, that are based on common, well-established definitions. With the structured interface 114, the information used as input data will be consistent and more reliable as a source of subsequent analysis. Additionally, checking the information against the rules in the data validation component 116 further enhances the reliability of the input data by excluding erroneous input data before it is used as a basis for calculations in the data analysis component 120.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

The invention claimed is:

1. A process for calculating a mean-time-to-failure ("MTTF") metric for a given type of equipment placed into service, the process comprising:
   maintaining a central database;
   accessing the central database from a remote terminal through an interface;
   entering performance information about the given type of equipment into the central database through the interface, wherein the interface restricts the entered performance information into the central database to a controlled group of responses to a series of scripted prompts;
   validating the entered performance information against a set of rules; and
   analyzing the validated performance information to calculate a mean-time-to-failure ("MTTF") metric according to the formula:

$$MTTF = (N \times T)/F,$$

where,
   N is a selected number of wells in which the given type of equipment is placed into service;
   T is a selected time period; and
   F is a number of failures; and
   displaying the MTTF through the interface for use in improving performance of the given type of equipment.

2. The process of claim 1, wherein the step of validating the entered performance information includes checking the entered performance information for temporal and geographic inconsistencies.

3. A process for calculating an equipment run life ("ERL") metric for a given type of equipment placed into service, the process comprising:
   maintaining a central database;
   accessing the central database from a remote terminal through an interface;
   entering performance information about the given type of equipment into the central database through the interface, wherein the interface restricts the entered performance information into the central database to a controlled group of responses to a series of scripted prompts;
   validating the entered performance information against a set of rules; and
   analyzing the validated performance information to calculate an equipment run life ("ERL") metric, wherein the ERL is calculated as the average run life, from start to stop times, of a specific group or type of equipment; and
   displaying the ERL through the interface for use in improving performance of the given type of equipment.

4. The process of claim 3, wherein the step of validating the entered performance information includes checking the entered performance information for temporal and geographic inconsistencies.

5. A process for calculating a failure distribution ("FD") metric for a given type of equipment placed into service, the process comprising:
   maintaining a central database;
   accessing the central database from a remote terminal through an interface;
   entering performance information about the given type of equipment into the central database through the interface, wherein the interface restricts the entered performance information into the central database to a controlled group of responses to a series of scripted prompts;
   validating the entered performance information against a set of rules, wherein the step of validating the entered performance information includes checking the entered performance information for temporal and geographic inconsistencies;
   analyzing the validated performance information to calculate a failure distribution ("FD") metric, wherein the FD is a histogram of failures for the given type of equipment that occurred during a specified date range; and
   displaying the FD though the interface for use in improving performance of the given type of equipment.

* * * * *

UNITED STATES PATENT AND TRADEMARK OFFICE
CERTIFICATE OF CORRECTION

PATENT NO. : 7,236,910 B1
APPLICATION NO. : 11/047886
DATED : June 26, 2007
INVENTOR(S) : Mark Garrett et al.

It is certified that error appears in the above-identified patent and that said Letters Patent is hereby corrected as shown below:

Column 2 Line 14 should read "of an end"

Column 3 Line 47 should read "utilities. Selecting"

Signed and Sealed this

Twenty-seventh Day of October, 2009

David J. Kappos
*Director of the United States Patent and Trademark Office*